(12) United States Patent
Harada

(10) Patent No.: US 8,479,191 B2
(45) Date of Patent: Jul. 2, 2013

(54) SOFTWARE INSTALLING METHOD BASED ON ACQUIRED EQUIPMENT INFORMATION AND STORAGE MEDIUM THEREOF

(75) Inventor: Seiji Harada, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1568 days.

(21) Appl. No.: 11/607,077

(22) Filed: Dec. 1, 2006

(65) Prior Publication Data

US 2007/0288916 A1 Dec. 13, 2007

(30) Foreign Application Priority Data

May 25, 2006 (JP) ................................. 2006-145469

(51) Int. Cl.
*G06F 9/445* (2006.01)
(52) U.S. Cl.
USPC .......................................... 717/174; 717/176
(58) Field of Classification Search
None
See application file for complete search history.

(56) References Cited

U.S. PATENT DOCUMENTS

| | | | | | |
|---|---|---|---|---|---|
| 5,826,103 | A | * | 10/1998 | Whittaker | 710/8 |
| 5,845,301 | A | * | 12/1998 | Rivette et al. | 715/210 |
| 7,689,673 | B2 | * | 3/2010 | Kemp et al. | 709/220 |
| 7,895,367 | B2 | * | 2/2011 | Nakamura | 710/8 |
| 7,895,609 | B2 | * | 2/2011 | Inoue | 719/327 |
| 2002/0085047 | A1 | * | 7/2002 | Aritomi | 345/853 |
| 2003/0065773 | A1 | * | 4/2003 | Aiba et al. | 709/224 |
| 2003/0078998 | A1 | * | 4/2003 | Lacome D'Estalenx | 709/220 |
| 2003/0093768 | A1 | * | 5/2003 | Suzuki | 717/100 |
| 2003/0160989 | A1 | * | 8/2003 | Chapin et al. | 358/1.13 |
| 2003/0217194 | A1 | * | 11/2003 | Kazumi et al. | 709/321 |
| 2003/0233488 | A1 | * | 12/2003 | Ozaki et al. | 709/321 |
| 2004/0105113 | A1 | * | 6/2004 | Ishida et al. | 358/1.13 |
| 2005/0044200 | A1 | * | 2/2005 | Aritomi | 709/223 |
| 2005/0097238 | A1 | * | 5/2005 | Oomori et al. | 710/15 |
| 2005/0108705 | A1 | * | 5/2005 | Koyama | 717/174 |
| 2005/0210464 | A1 | * | 9/2005 | Machida | 717/174 |
| 2007/0047524 | A1 | * | 3/2007 | Moriya | 370/352 |
| 2007/0083621 | A1 | * | 4/2007 | Nuggehalli | 709/221 |
| 2007/0097400 | A1 | * | 5/2007 | Yasui et al. | 358/1.13 |
| 2007/0127069 | A1 | * | 6/2007 | Steele et al. | 358/1.16 |
| 2007/0143504 | A1 | * | 6/2007 | Yoshida | 710/8 |
| 2007/0260786 | A1 | * | 11/2007 | Fukunaga et al. | 710/62 |

FOREIGN PATENT DOCUMENTS

| | | | |
|---|---|---|---|
| JP | 10-133833 | | 5/1998 |
| JP | 2002-268783 | | 9/2002 |
| JP | 2003330584 | A * | 11/2003 |
| JP | 2005-301608 | | 10/2005 |

OTHER PUBLICATIONS

Japanese Office Action dated Apr. 22, 2008.

* cited by examiner

*Primary Examiner* — Insun Kang
(74) *Attorney, Agent, or Firm* — Finnegan, Henderson, Farabow, Garrett & Dunner, L.L.P.

(57) ABSTRACT

A software installing method for installing software to a computer is disclosed. The method includes reading a software program to the computer, the software program corresponding to an equipment connected to the computer. The method further includes acquiring equipment information of the equipment from the equipment connected to the computer. The method also includes displaying an image representing a combination of parts of the equipment based on the acquired equipment information of the equipment on a display section prior to installing the software program, and installing the software program to the computer.

12 Claims, 10 Drawing Sheets

SOFTWARE INSTALLING METHOD BASED ON ACQUIRED EQUIPMENT INFORMATION AND STORAGE MEDIUM THEREOF

CROSS-REFERENCE TO RELATED APPLICATION

The present U.S. patent application claims a priority under the Paris Convention of Japanese patent application No. 2006-145469 filed on May 25, 2006, which shall be a basis of correction of an incorrect translation.

BACKGROUND

1. Field of the Invention

The present invention relates to a software installing method and a storage medium.

2. Description of Related Art

In earlier development, in computers to which a device driver for an operation of equipments connected so as to communicate has been installed, some computers have been known, which allow a user to select the equipment intuitively by displaying the illustration of the exterior thereof on a display and so on when the user selects and uses variety types of equipments whose device driver has been installed. For example, JPHei10-133833A and JP2002-268783 disclose a technique to acquire an exterior illustration from equipment (printer) which can be controlled by a computer through a device driver or the like and is connected to a network, and to display it.

According to such technique, for example when various type of the equipments connected so as to communicate are network printers and a user select an output printer from the printers whose device drivers are installed and executes the printing on the computer, a user can select the output printer easily by consulting the exterior view of the printer displayed on the screen.

However, the above-described technique was for selecting equipment corresponding to the device driver which had been already installed, and the exterior of equipment which had not been installed yet could not be displayed and selected. When there are plural candidate equipments for the installation of the device driver and the device driver for one of the equipments is intended to be installed in the computer which is connected with various types of the equipments so as to communicate each other, it was impossible to display an information such as the exterior on the display and to allow a user confirm it. As a result, it was difficult for a user to identify the equipment whose device driver the user intends to install to use the equipment.

SUMMARY

It is one of objects of the present invention, upon the consideration of the conventional technique, to provide a technique to install a device driver corresponding to the equipment intended by a user in a computer easily.

In order to accomplish the above object, in accordance with a first aspect of the invention, a software installing method to a computer comprising the steps of: installing a software program to the computer, the software program corresponding to an equipment connected to the computer; acquiring equipment information of the equipment from the equipment connected to the computer; and displaying the acquired equipment information of the equipment on the display section prior to the installing step.

Preferably, software program information corresponding to each of the equipments is acquired in the acquiring step, and the equipment information displayed on the display section prior to the installing step is the software program information corresponding to one of the equipments acquired based on the equipment information from the acquired software program information corresponding to each of the equipments.

Preferably, the equipment information is web page data, and the equipment information is displayed on the display section based on the acquired web page data prior to the installing step.

Preferably, the equipment connected to the computer comprises an image forming section, and the software program to be installed in the computer is a driver program of the equipment comprising the image forming section.

Preferably, the equipment information is acquired by using a Management Information Base in a Simple Network Management Protocol.

Preferably, the equipment information is information of an optional setup added to the equipment.

Preferably, the equipment information is information of an exterior of the equipment.

BRIEF DESCRIPTION OF THE DRAWINGS

These and other objects, advantages and features of the present invention will become more fully understood from the detailed description given hereinbelow and the appended drawings, and thus are not intended as a definition of the limits of the present invention, and wherein.

DETAILED DESCRIPTION OF THE PREFERRED EMBODIMENT

Hereinafter, the embodiment of the present invention will be described with reference to FIGS. 1 to 8. The invention is not limited to the following embodiment. The embodiment of the invention is to show the best mode of the invention, so the uses or the terms are not limited to the embodiment.

Figure 1:
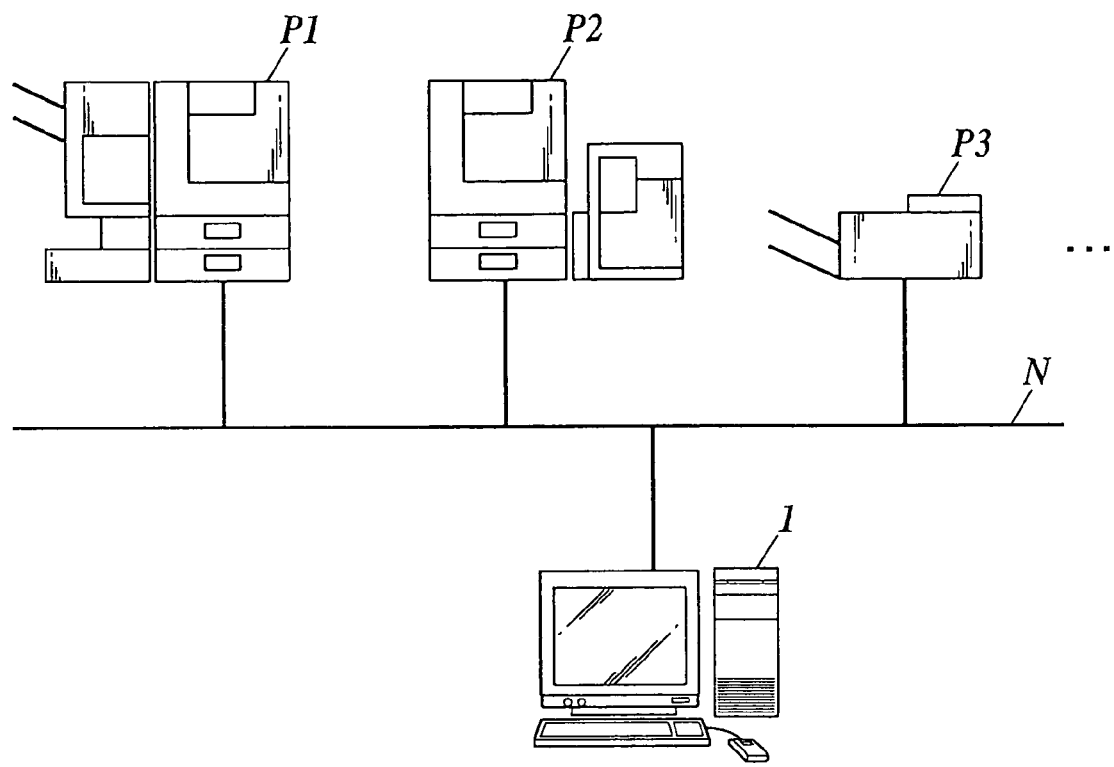
FIG. 1 is a conceptual diagram showing an example of a connection between printers P1, P2 and P3, and a computer 1.

As shown in FIG. 1, printers P1, P2 and P3 as MFPs (Multi Function Peripherals) which form images on a recording medium such as papers based on an inputted data and in addition have various types of functions such as copying and scanning, and a computer 1 as an information equipment such as a PC (Personal Computer) or a WS (Work Station), are connected to be able to communicate with each other through a network N.

The network N is a communication line for performing communication in conformity with predetermined standards, such as a LAN (Local Area Network), a WAN (Wide Area Network), the internet, a USB (Universal Serial Bus) and an IEEE1394 (Institute of Electrical and Electronic Engineers 1394), and performs data communication among the connected terminals. The data communication may be either of a parallel communication and a serial communication as long as the data communication conforms to the predetermined standards. In addition to the above-described wire communication, the data communication is not particularly limited, and may be wireless communication such as wireless LAN, e.g. IEEE802.11a, 802.11b, or 802.11g, Bluetooth wireless communication, and an infrared communication such as IrDA (Infrared Data Association).

Figure 2:
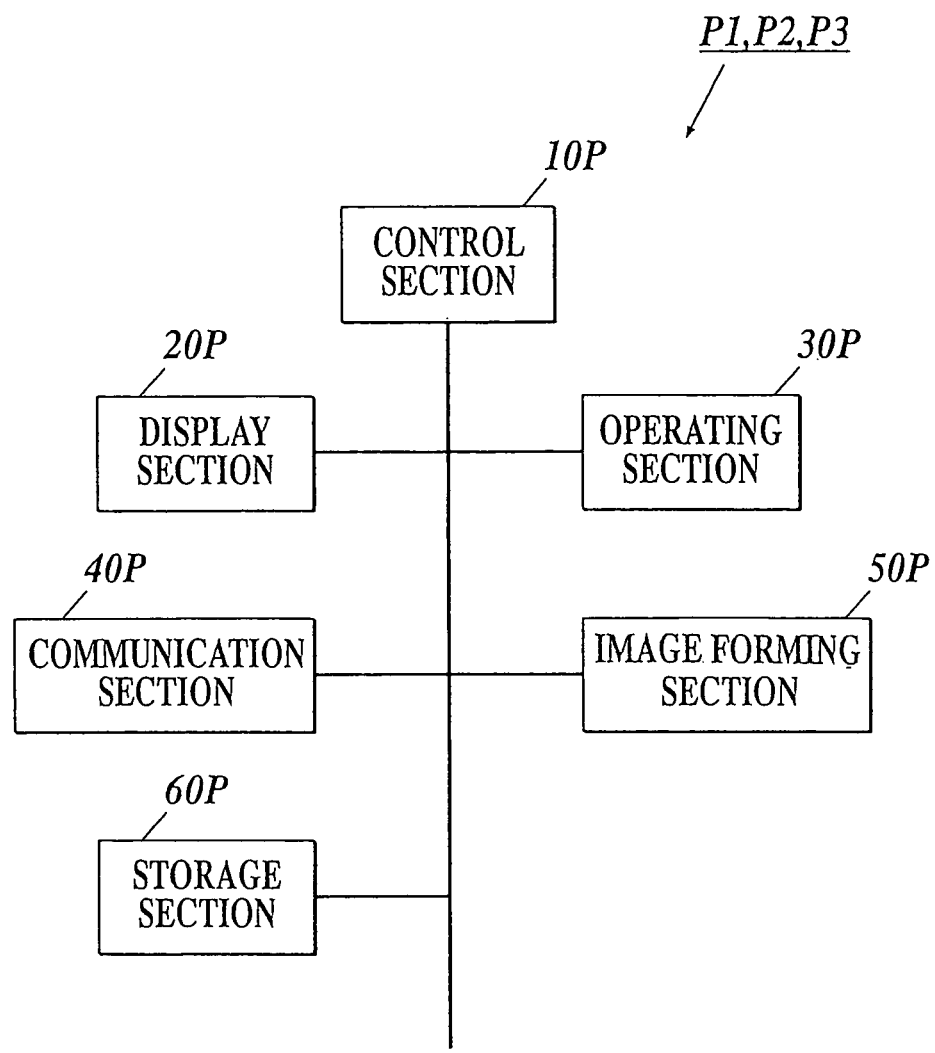
FIG. 2 is a block diagram showing a functional composition of the printers P1, P2 and P3 schematically.

The printers P1, P2 and P3, as shown in FIG. 2, comprise a control section 10P, a display section 20P, a operating section 30P, a communication section 40P, an image forming section 50P, and a storage section 60P. These sections are connected with each other by a bus and so on.

The control section 10P comprises a CPU (Central Processing Unit), a ROM (Read Only Memory), a RAM (Random Access Memory), and so on. The CPU develops various types of programs or data stored in the ROM or storage section 60P into a working area of the RAM and executes them sequentially, so that the control section 10P controls operations of each section to control whole of the equipment integrally.

Specifically, the control section 10P controls each section based on control information and image data which are inputted through the communication section 40P so as to form images in the image forming section 50P. The control section 10P, based on the control information inputted through the communication section 40P, outputs data, such as configuration information, stored in the storage section 60P to external equipments through the communication section 40P. For example, the control section 10P replies by outputting the configuration information to a query by communication of the external equipments.

The display section 20P is, for example, a LCD (Liquid Crystal Display) and so on, and displays images based on a display control by the control section 10P. The operating section 30P is an operation key which is not particularly illustrated, a pressure-sensitive (resistive) touch panel in which transparent electrodes are disposed in a reticular pattern on a screen of the display section 20P, and so on. The operating section 30P outputs inputted operation signal to the control section 10P.

The communication section 40P comprises communication circuits for communicating with other information equipments through the above-described network N and an interface to connect to the network N. The communication section 40P performs the data communication with the external equipments, specifically with the computer 1, under a control by the control section 10P. The image forming section 50P is a functional section which forms images on a recording medium such as papers by various types of printing methods such as an electrophotographic method, ink-jet method, thermal sublimation method, and so on, based on the data inputted through the communication section 40P and so on, under the control by the control section 10P.

The storage section 60P is composed of, for example, a magnetic storage medium, optical storage medium, or non-volatile storage such as semiconductors, and is readable and writable by the control section 10P so as to store various types of control programs of the equipment, the configuration information of the equipment, inputted data from the communication section 40P and so on. The storage section 60P may comprise an interface to which the above-described storage medium such as the magnetic storage medium, optical storage medium, and nonvolatile memory are removably loaded, and data may be read and written through the interface. In this case, under the control by the control section 10P, it is possible to read out the data previously stored in the loaded storage medium, and to form images in the image forming section 50P and transfer data from the communication section 40P to the external equipments.

The printers P1, P2, and P3 may comprise a scanning part to read an original image under the control by the control section 10P and a finisher part to execute sheet finishing such as stapling, punching holes, and so on to the storage medium formed in the image forming section 50P under the control by the control section 10P, and may execute copying, scanning or various sheet finishing to storage medium responding to operation direction on the operating section 30P or control direction by external equipments.

Figure 3:
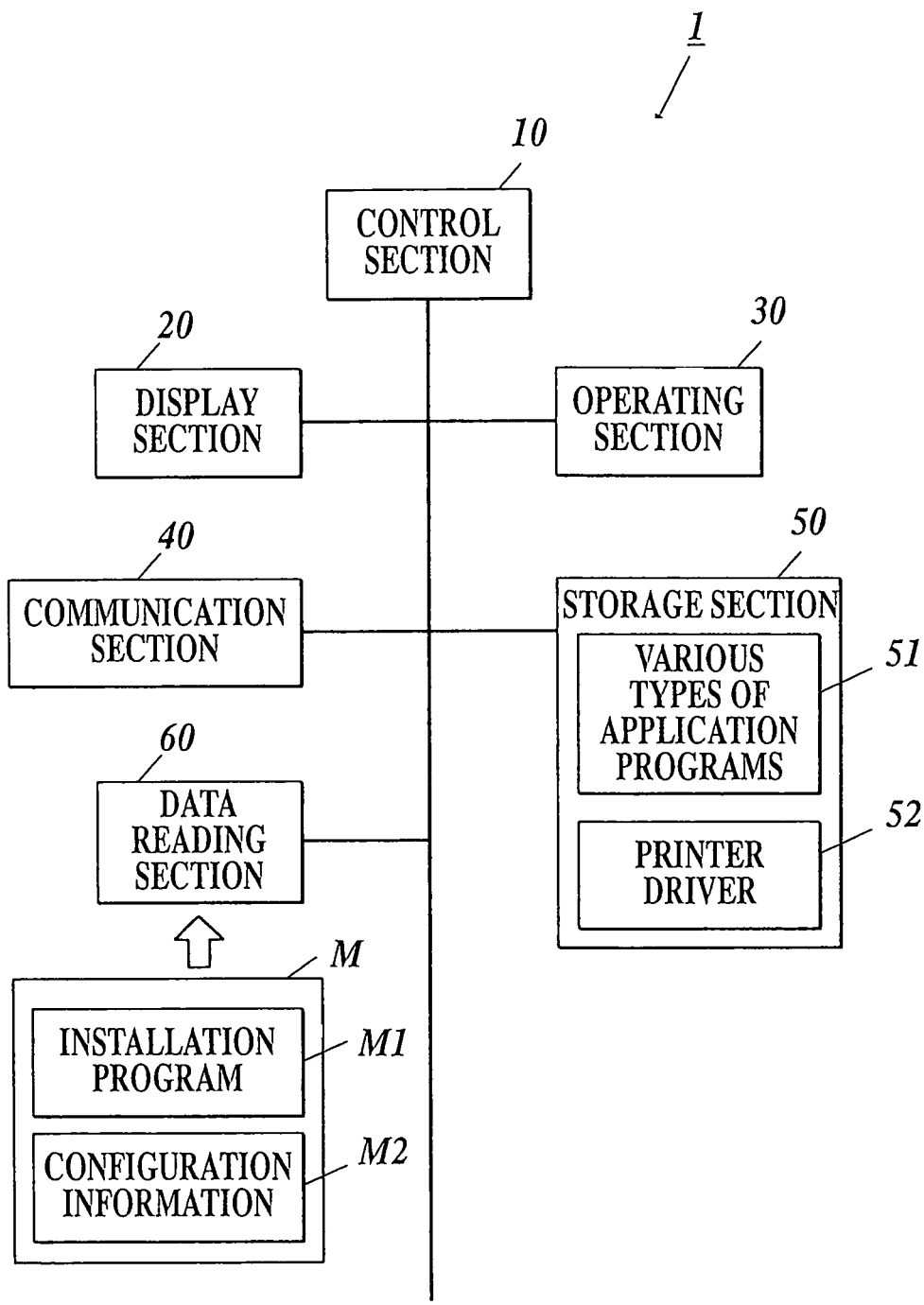
FIG. 3 is a block diagram showing a functional composition of the computer 1 schematically.

The computer 1 comprises, as shown in FIG. 3, a control section 10, a display section 20, an operating section 30, a communication section 40, a storage section 50 and a data reading section 60. These sections are connected with each other through a bus and so on.

The control section 10 comprises a CPU, a ROM, a RAM, and so on. The CPU develops various types of control programs and data read from the ROM, the storage section 50 or the data reading section 60, into a working area of RAM and executes them sequentially, so that the control section 10 controls operations of each section and controls whole of the equipment.

The display section 20 is, for example, a CRT (Cathode-Ray Tube), a LCD, an organic or inorganic ELD (Electro Luminescence Display), a plasma display, and so on. The display section 20 displays display data inputted from the control section 10 on a screen under the control by the control section 10.

The operating section 30 comprises a key board comprising numeral keys, alphabetic keys, various types of functional keys and so on, and a pointing device such as a mouse and a touch panel, and outputs the inputted operation signal to the control section 10. The communication section 40 comprises communication circuits for communicating with other information equipments through the above-described network N and an interface connected to the network N. The communication section 40 performs the data communication with the external equipments, specifically with the printers P1, P2, and P3, under the control by the control section 10.

The storage section 50 is composed of, for example, a magnetic storage medium, optical storage medium, or non-volatile memory such as semiconductors and so on, and is readable and writable by the control section 10. The storage section 50 stores various types of application program 51 for the computer 1, a printer driver 52 to output the control information and printing job data for forming images to the printers P1, P2 and P3 connected to the computer 1 to be able to communicate with each other, and various types of the configuration information.

The data reading section 60 comprises an interface to which a storage medium M such as a magnetic storage medium, optical storage medium, and nonvolatile memory are removably loaded. The data stored in the storage medium M is read out trough the interface. The data reading section 60 may write data on the storage medium M.

The storage medium M stores installation program M1 which the control section 10 reads out and executes to install a software program so that the computer 1 can execute it, such as the program of installation processing to store the printer driver 52 in the storage section 50, and configuration information M2 which is a data of installed software program. The configuration information M2 to be stored in the storage medium M is the data as the printer driver 52 stored in the storage section 50, and includes image data of exterior appearance of the printer for displaying exterior of the printer to be controlled when the printer is operated through the printer driver 52. The image data of exterior appearance of the printer comprises, for example, multiple image data in each color or shape which are different in each production model, and multiple image data in each optional setup.

Figure 4:
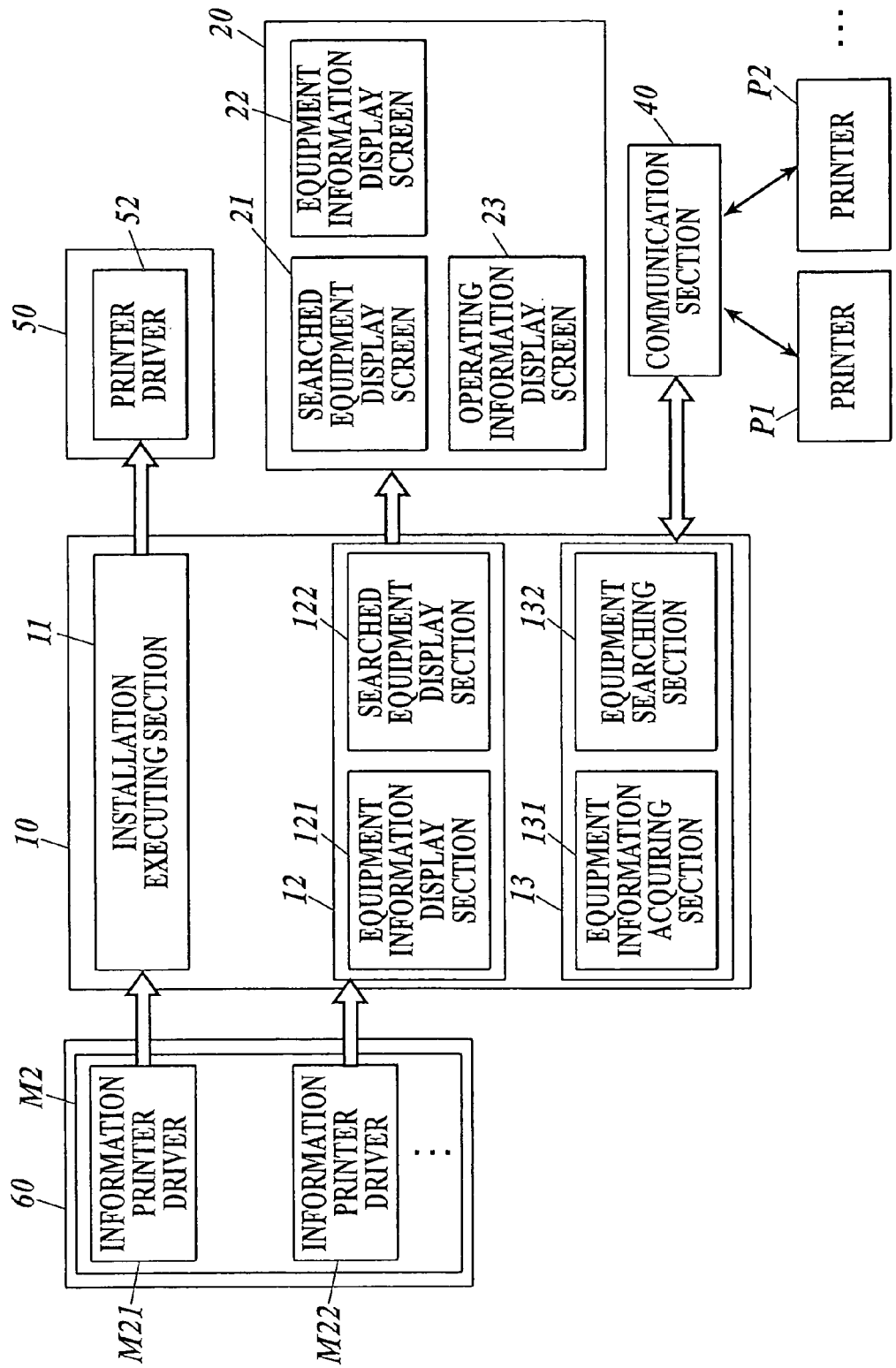
FIG. 4 is a conceptual diagram showing a functional composition of the computer 1 at software installation schematically.
Figure 5:
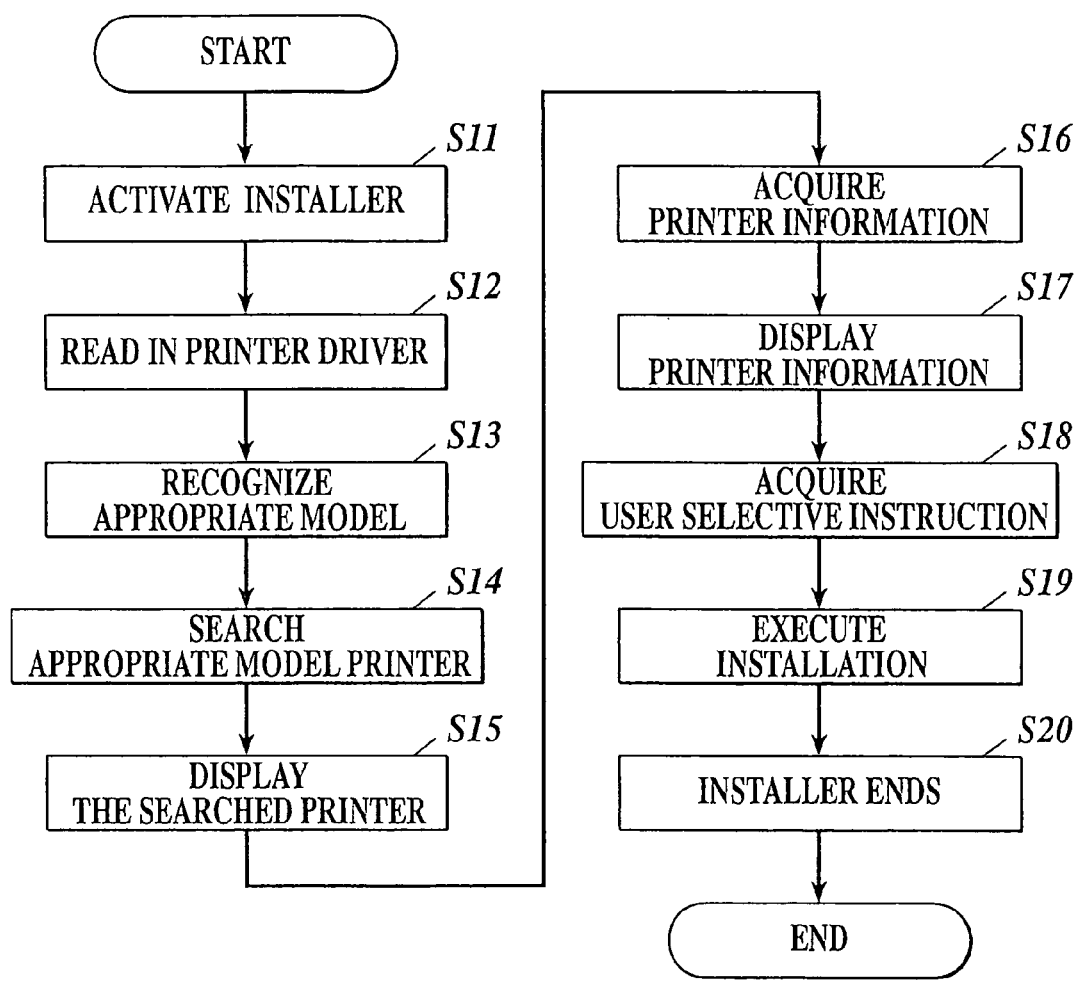
FIG. 5 is a flow chart showing the installation processing in the computer 1.

The functional composition when the control section 10 reads out the installation program M1 and executes it, so as to install the corresponding printer driver 52 to the printers P1 or P2 connected through the communication section 40 will be described. As shown in FIG. 4, the control section 10 functions as an installation executing section 11, a user interface 12, and a communication interface 13 by executing the installation program M1.

The installation executing section 11, according to a selection direction given by a user interface section 12 described below, reads out the configuration information M2 and stores the printer driver 52 corresponding to the printers P1, P2 and other printers in the storage section 50. The configuration information M2 is the information of the printer driver of each product or model of the printers such as the printers P1 and P2, and comprises the printer driver information M21 and M22 including the above-described image data of exterior appearance of the printer. The configuration information M2, as well as storing the information in each product or model of the printers according to above-described printer driver information M21 or M22, may store the information in each product or model in a table format. The configuration information M2 is not particularly limited to the above composition.

The user interface section 12, prior to an installation of the printer driver 52, receives the selection direction of the printer driver which displays an installation screen to be displayed on the display section 20, performs installation, from the operating section 30, and sends it to the installation executing section 11. Specifically, the installation screen to be displayed on the display section 20 is displayed on an equipment information display section 121 and a searched equipment display section 122.

The equipment information display section 121 is a functional section which displays information of the printers P1 and P2 connected trough the communication section 40 and searched by an equipment information acquiring section 131 described below on the display section 20. The searched equipment display section 122 is a functional section which acquires the information of the printer searched by the equipment searching section 132 described below as an installation object, namely, the information of the printer which can be communicated through the communication section 40 and the information of the printer driver corresponding to the above printer from the configuration information M2, and displays it on the screen of the display section 20.

In other words, the user interface section 12 displays the information such as an installable printer driver and the corresponding equipment, the information sent from a communication interface section 13 described below and so on. The user interface section 12 accepts installation conditions such as installation object equipments and a type of the printer drivers on the operation section 30 and sends it to the installation executing section 11.

The installation screen displayed on the display section 20 based on the display control of the user interface section 12 comprises a searched equipment display screen 21, an equipment information display screen 22 and an operating information display screen 23. The searched equipment display screen 21 is to display the list of the printers P1, P2, and so on connected to the computer 1 through the communication section 40 searched as an installation object of the printer driver 52. The equipment information display screen 22 is to display particular information of the equipments such as the printers P1 and P2 searched as the installation object. Specifically, it displays exterior images corresponding to the figure of the printers P1 and P2 searched as the installation object by executing the processing described below. The operating information display screen 23 is a screen which displays selection button and so on to accept the operation from the operation section 30.

The communication interface 13 is a functional section which comprises the equipment information acquiring section 131 and an equipment searching section 132, communicates with the external equipments connected to the communication section 40 to be able to communicate with each other, and sends the information acquired by this communication to the user interface section 12. The equipment information acquiring section 131 acquires the information from the printers P1 and P2 connected with the communication section 40. Specifically, the equipment information acquiring section 131 performs data communication by the predetermined communication protocol such as a SNMP/MIB (Simple Network Management Protocol/Management Information Base) in a TCP/IP (Transmission Control Protocol/Interne Protocol) with the printers P1 and P2, and acquires various types of configuration information and so on from the printers P1 and P2.

The equipment searching section 132 communicates with all equipments connected with the communication section 40 similarly by using the predetermined protocol, e.g. the SNMP/MIB in TCP/IP, and searches the printer corresponding to the printer driver information M21 or the printer driver information M22 of the configuration information M2. All equipments connected with the communication section 40 to be able to communicate each other may be equipments connected to the same node of the network N to which the communication section 40 is connected. In other words, when the communication network is divided into several nodes by a router and so on, the equipments belonged to the node connected with the communication section 40 are the searching objects.

The installation processing executed by the control section 10 reading out the installation program M1 will be described. As shown in the FIG. 5, the control section 10 reads out the installation program M1 from the storage medium M loaded to the data reading section 60, according to the operation direction from the operating section 30 and so on, and realizes the functions as the above-described installation executing section 11, user interface section 12 and communication interface 13. In other words, it activates the function as an installer (Step S11).

Next, the control section 10 reads in the information of the printer driver, namely the configuration information M2, from the storage medium M (Step S12), recognizes the information stored in the storage medium M such as a product model name of the printer corresponding to the printer driver so as to recognize an appropriate model (Step S13). The recognition of the appropriate model is performed by reading in the printer driver information M21, M22 and so on of each product or model of the printers in the storage medium M.

Next, the control section 10 searches the appropriate model printer corresponding to the printer driver stored in the storage medium M from the equipments connected with the communication section 40 by the appropriate model recognized in the configuration information M2 and the searching by the equipment searching section 132 (Step S14). Specifically, the control section 10 compares the "product name" (model name) of the data searched by the equipment searching section 132 as shown in table 1 with the information of the product name or the model name such as the printer driver information M21 and M22, and detect the appropriate model printer.

TABLE 1

| IP ADDRESS | 10.20.30.40 | 10.20.30.41 | 10.20.30.42 |
|---|---|---|---|
| PRODUCT NAME | MODEL A | MODEL A | MODEL B |
| NICK NAME | ABC | ABC2 | KEN |
| LOCATION | ENTRANCE | CENTER | KEN'S DESK |

Figure 6:
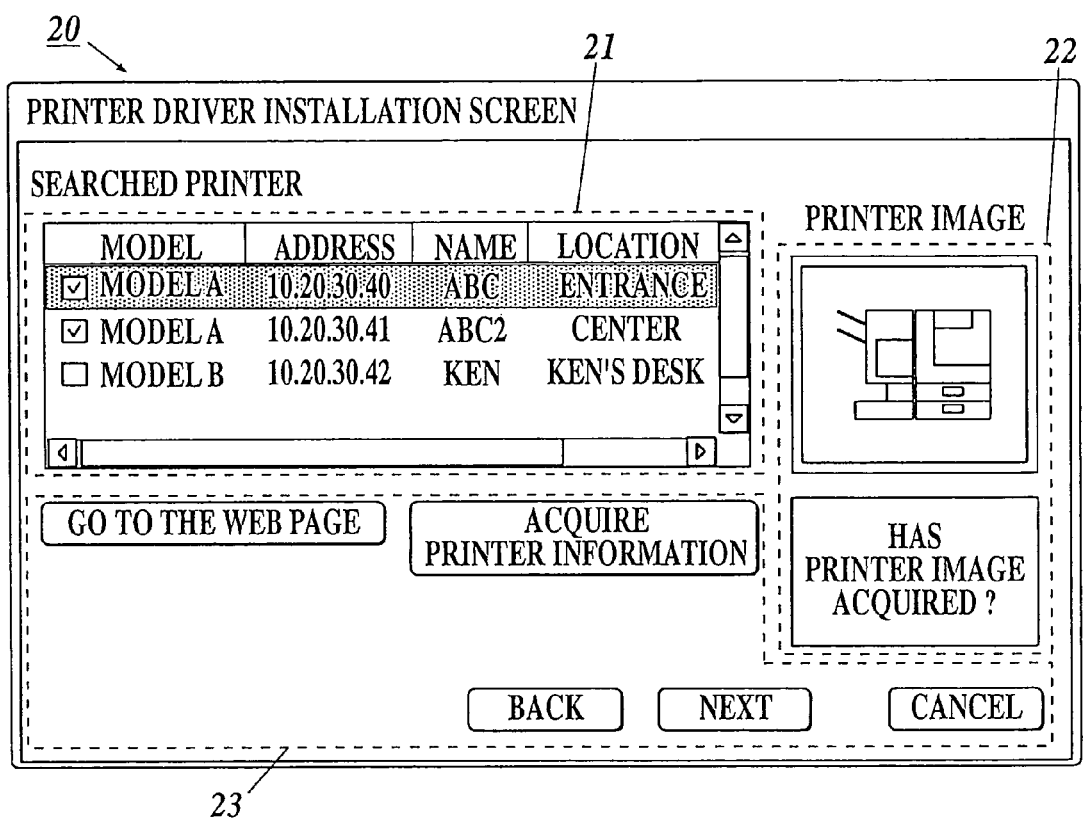
FIG. 6 is a diagram showing an example of a screen on a displaying section 20.

Next, the control section 10 outputs the list of the appropriate model printer searched by the equipment searching section 132 to the searched equipment display section 122, and by the control of the searched equipment display section 122, displays the list of the searched appropriate model printer on the searched equipment display screen 21 of the display section 20 as shown in FIG. 6 (Step S15).

Next, the control section 10 acquires the information of the printer selected by operation on the operation part 30 from the appropriate model printers listed on the searched equipment display screen 21 (the printer highlighted in FIG. 6) by using the equipment information acquiring section 131 (Step S16). The information acquired by the equipment information acquiring section 131, as shown in table 2, includes the information of the optional setup of the equipments as "optional extras" and the information of the outward color of the equipment as "exterior color" as well as the information acquired in the equipment searching section.

TABLE 2

| IP ADRESS | 10.20.30.40 | 10.20.30.41 | 10.20.30.42 |
|---|---|---|---|
| PRODUCT NAME | MODEL A | MODEL A | MODEL B |
| NICK NAME | ABC | ABC2 | KEN |
| LOCATION | ENTRANCE | CENTER | KEN'S DESK |
| OPTIONAL EXTRAS | FINISHER NO ADDITIONAL TRAY | NO FINISHER ADDITIONAL TRAY | NOTHING |
| EXTERIOR COLOR | BLACK | WHITE | BLUE |

Next, the control section 10 outputs the information acquired by the equipment information acquiring section 131 to the equipment information display section 121, and by the control of the equipment information display section 121, displays a detail information of the printer selected on the searched equipment display screen 21, on the equipment information display screen 22 as shown in FIG. 6 (Step S17). Specifically, it displays the exterior of the selected printer and so on.

The exterior image of the printer displayed on the equipment information display screen 22 is composed based on the information acquired by the equipment information acquiring section 131 and the image data of each optional setup or exterior of the equipment stored in the printer driver information M21 and M22. For example, the "image data" of each "body composition" as shown in table 3 is stored in the printer driver information M21.

TABLE 3

| BODY COMPOSITION | IMAGE DATA |
|---|---|
| BODY IS BLACK | IMAGE DATA OF BODY WHOSE EXTERIOR IS BLACK |
| BODY IS WHITE | IMAGE DATA OF BODY WHOSE EXTERIOR IS WHITE |
| FINISHER | IMAGE DATA OF FINISHER |
| ADDITIONAL TRAY | IMAGE DATA OF ADDITIONAL TRAY |

In the printer driver information M22, the "image data" of each "body composition" as shown in table 4 is stored.

TABLE 4

| BODY COMPOSITION | IMAGE DATA |
|---|---|
| BODY IS BLUE | IMAGE DATA OF BODY WHOSE EXTERIOR IS BLUE |
| BODY IS RED | IMAGE DATA OF BODY WHOSE EXTERIOR IS RED |
| ADDITIONAL TRAY | IMAGE DATA OF ADDITIONAL TRAY |

The examples of the composition based on each above-described data are shown in table 5.

TABLE 5

| IP ADDRESS | 10.20.30.40 | 10.20.30.41 | 10.20.30.42 |
|---|---|---|---|
| PRODUCT NAME | MODEL A | MODEL A | MODEL B |
| COMBINATION OF IMAGE DATA | BLACK + FINISHER | WHITE + ADDITIONAL TRAY | BLUE |

Figure 7:
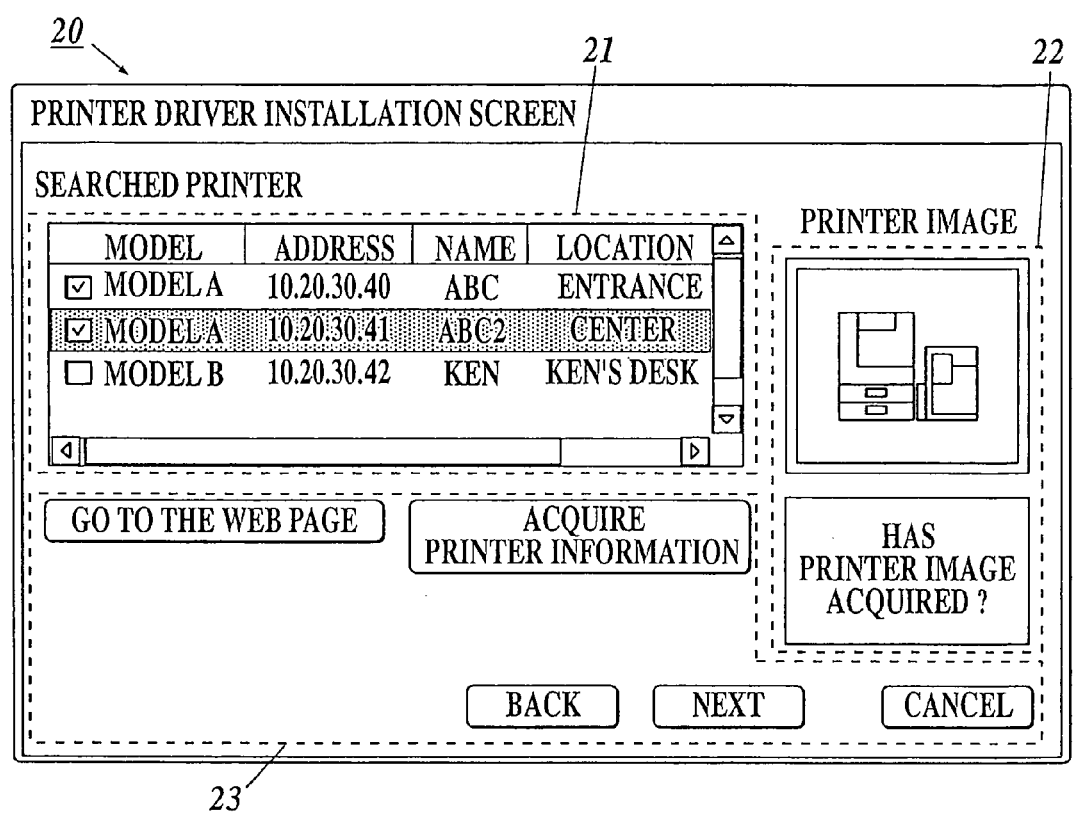
FIG. 7 is a diagram showing an example of the screen on the displaying section 20.
Figure 8:
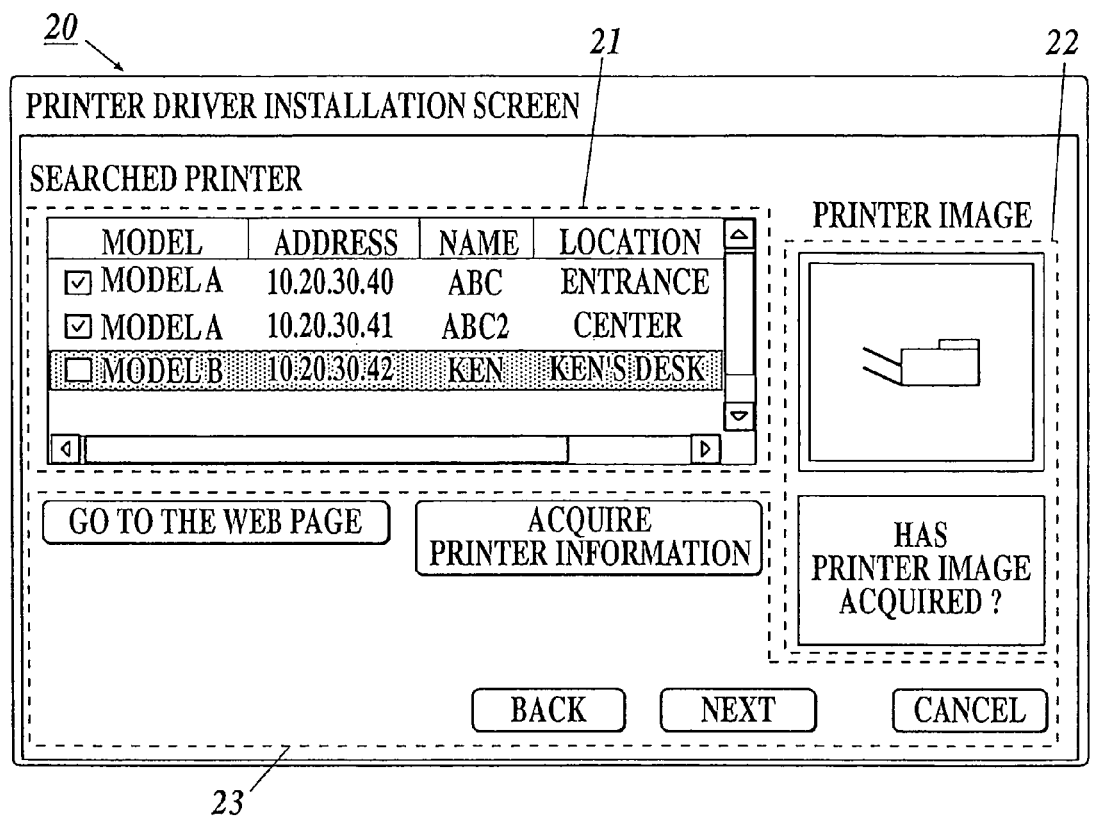
FIG. 8 is a diagram showing an example of the screen on the displaying section 20.

When the detail of the "model A" printer whose "IP address" is "10.20.30.40" among the printers in table 5 is displayed, as shown in FIG. 6, the exterior image of the body whose exterior color is "black", and which comprises the "finisher" as the optional extras is displayed on the equipment information display screen 22. When the detail of the "model A" printer whose "IP address" is "10.20.30.41" is displayed, as shown in FIG. 7, the exterior image of the body whose exterior color is "white", and which comprises the "additional tray" as the optional extras is displayed on the equipment information display screen 22. When the detail of the "model B" printer whose "IP address" is "10.20.30.42" is displayed, as shown in FIG. 8, the exterior image of the body which comprises no optional extras, and whose exterior color is "blue" is displayed on the equipment information display screen 22.

Next, the control section 10 acquires the user's selection of the printer whose printer driver is to be installed from the selection on the searched equipment display screen 21 and the operation of the selection button on the operating information display screen 23 made by the operation on the operation section 30 (Step S18). The control section 10 sends the acquired information of the printer driver to be installed to the installation executing section 11 and executes the installation of the printer driver (Step S19). Finally, the control section 10 ends the function as an installer (Step S20) to end the processing.

Variation of the Embodiment

A variation of the above-described embodiment, in which the printers P1, P2 and P3 in FIG. 1 are printers P10, P20, and P30 which have a function as web servers, and the user interface 12 in FIG. 4 is a user interface 12a which has a function as a web browser, will be described with reference to FIGS. 9 and 10. The explanation to the composition which is as same as the above-described embodiment is omitted for simplification.

Figure 9:
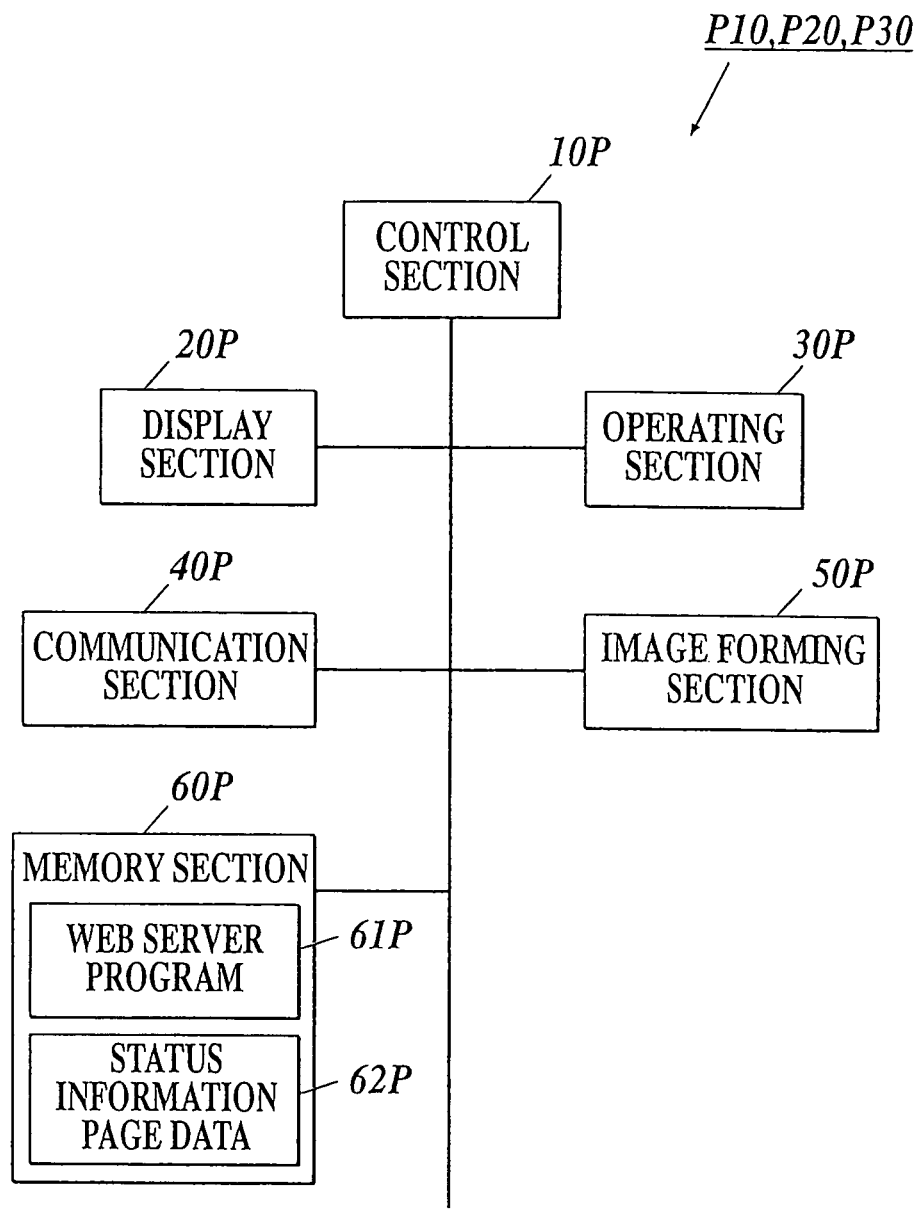
FIG. 9 is a block diagram showing a functional composition of the printers P10, P20 and P30 schematically.

FIG. 9 is a block diagram which shows the functional composition of the printers P10, P20, and P30 schematically. FIG. 10 is a conceptual diagram which shows the functional composition of the variation schematically when the software installation is executed in the computer 1.

The printers P10, P20 and P30, as shown in FIG. 9, comprises the above-described control section 10P, display section 20P, operating section 30P, communication section 40P, image forming section 50P and the storage section 60P, and these sections are connected with each other by a bus and so on. The storage section 60P stores, as well as the configuration information to be outputted to the external equipments based on the control information inputted through the communication section 40P, a web server program 61P and stats information page data 62P.

The web server program 61P is executed by the control section 10P so as to function as a web server which receives the request by the HTTP (HyperText Transfer Protocol) communication through the communication section 40 and returns the information of the requested URL (Uniform Resource Locator) to the source of the request. The status information page data 62P is a web page data stored in the URL, in which the configuration information of the equipment is described in HTML (HyperText Transfer Protocol).

The web page data in which the configuration information of the equipment is described is, for example, a page provided with a link to display, the image data corresponding to the exterior color and the optional extras as well as text display data. In other wards, the web page can display the exterior image which shows the states of the equipment, when it is displayed by a browser.

The printers P10, P20, and P30 works as web servers and returns status information page data 62P which is the configuration information of the equipment to the acquisition request for the equipment information in which a URL is specified from the computer 1. The printers P10, P20, and P30 output a HTML statement dynamically responding to the request such as CGI (Common Gateway Interface) from the computer 1. For example, when the equipment information is requested, the web page data which is same as the status information page data 62P may be returned based on the configuration information stored in the storage section 60P.

Figure 10:
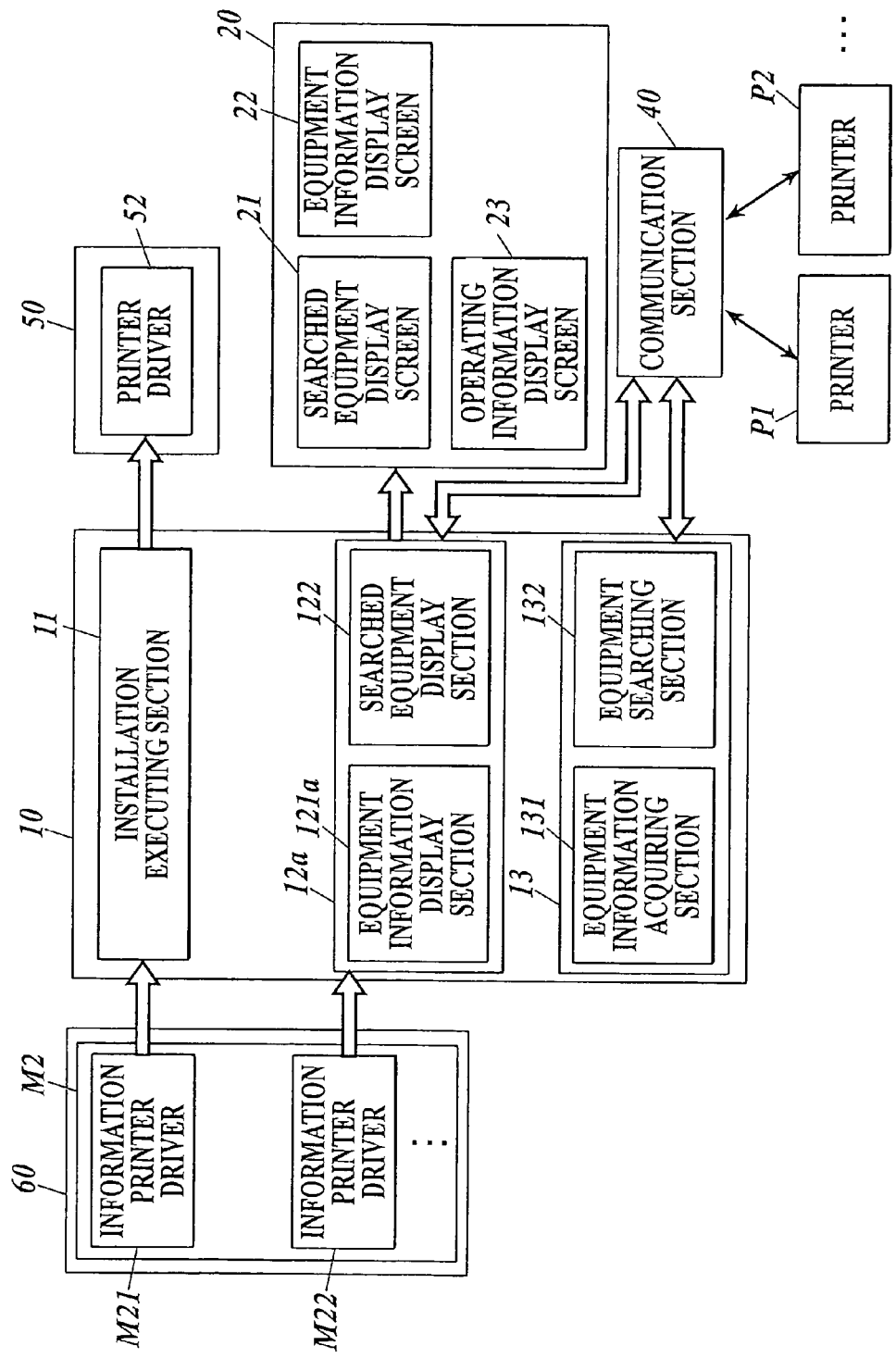
FIG. 10 is a conceptual diagram showing a functional composition of the computer 1 at the software installation schematically.

In the variation, the functional composition when the computer 1 installs the printer driver 52 is such that the equipment information display section 121 in the above-described user interface section 12 of the embodiment is an equipment information display section 121a which has the function as the web browser, as shown in FIG. 10.

When the equipment information display section 121a displays the detail information of the printer selected on the searched equipment display screen 21 on the equipment information display screen 22, it analyzes the HTML statement acquired based on the "URL" information of the data as shown in table 6, which is acquired in the equipment information acquiring section 131 and the equipment searching section 132, and displays it on the screen.

TABLE 6

| IP ADDRESS | 10.20.30.40 | 10.20.30.41 | 10.20.30.42 |
| PRODUCT NAME | MODEL A | MODEL A | MODEL B |

TABLE 6-continued

| NICK NAME | ABC | ABC2 | KEN |
| LOCATION | ENTRANCE | CENTER | KEN'S DESK |
| URL | http://10.20.30.40/default.html | http://10.20.30.41/default.html | http://10.20.30.42/default.html |

The above data of table 6 is acquired from the printers P10, P20 and P30, and stored in the storage section 60P of each printer. In each printer, the location of web page in which the configuration information of the printer, namely the location of the status information page data 62P is previously configured in the information of "URL" stored in the storage section 60P. By doing so, the equipment information display section 121a displays the web page acquired based on the information of the "URL" so as to display the configuration information of each printer on the screen.

Specifically, in the examples of FIGS. 6 to 8, in the state where one of the printers is selected on the searched equipment display screen 21, by selecting the button of "go to the web page" on the operating information display screen 23, it is possible to display the equipment exterior of the selected printer on the web page of the equipment information display screen 22.

As described above, in any above-described embodiments, the computer 1 acquires the configuration information of the printers P1 and P2 connected through the communication section 40 by the equipment information acquiring section 131 when the printer driver 52 is installed, outputs it to the equipment information display section 121, and displays the equipment information display screen 22 based on the acquired information on the display section 20 prior to the installation. A user has only to confirm the information of the printer displayed on the equipment information display screen 22 when the user installs the printer driver of the desired printer. Accordingly, an extra effort of user's conformation for an installation can be reduced, and installation can be performed easily.

The computer 1 acquires the information of the printer displayed on the equipment information display screen 22 from the configuration information M2 readable by the computer 1. Accordingly, the computer 1 can acquire the information of the printer to be displayed prior to the installation without going through the communication section 40, namely without placing a burden on the network N.

The computer 1 displays the information of the printer displayed on the equipment information display screen 22 based on the web page data acquired from the printer which has the web server function by referring to the URL information acquired from the printer, by the equipment information display section 121a.

The computer 1 can communicate with the printer connected through the communication section 40 by using MIB (Management Information Base) in SNMP (Simple Network Management Protocol).

The computer 1 can display the information of the optional setup and the exterior of the printer connected to the computer 1 acquired in the equipment information acquiring section 131 by the equipment information display section 121 on the equipment information display screen 22 of the display section 20. Thus, the software program of the optional setup or the exterior intended by a user can be easily installed.

The computer 1 can display the equipment information display screen 22 by the equipment information display section 121 based on the information acquired in the equipment information acquiring section 131 and the image information of each optional setup or each exterior stored in the configuration information M2. Thus, a load on the communication section 40 can be reduced, and also the exterior of the printer can be displayed even if the image data in each optional setup or each exterior is not stored in side of the printer.

The description of the embodiment is to show one example of the invention, and the present invention is not limited to the embodiment. The compositions and operations described in the embodiment can be changed appropriately within the spirit of the invention.

For example, the variation of the invention has the composition that the printers P10, P20 and P30 have the function as web servers, and performs HTTP communication with the web browser of the computer 1. However, FTP communication is possible, where the printer side functions as a FTP server and the computer 1 side functions as a FTP client. Further, the composition to acquire from a database server by SQL (Structured Query Language) and so on is possible. That is, the CSS (Client Server System) is not limited to HTTP communication between the web server and the client thereof, but may by FTP communication or the composition by the database and the terminals.

In the above embodiment, when the software program corresponding to the equipment connected to the computer is installed into the computer, it is possible to confirm the equipment which corresponds to the software program to be installed by the equipment information displayed on the display section prior to the installation. As a result, it is possible to install the software program corresponding to the equipment intended by a user to the computer easily.

In the above embodiment, when the software program corresponding to the equipment connected to the computer is installed, it is possible to acquire the equipment information displayed on the display section based on the information of the software program for the installation corresponding to the each equipment. As a result, it is possible to display the equipment information without placing a burden on the communication section.

In the above embodiment, it is possible to confirm the equipment information on the web page when the software program corresponding to the equipment connected to the computer is installed.

In the above embodiment, it is possible to install the software program corresponding to the equipment having the image forming part, which is intended by a user, to the computer easily.

In the above embodiment, it is possible to acquire the equipment information connected to the computer by using the MIB (Management Information Base) in the SNMP communication protocol (Simple Network Management Protocol).

In the above embodiment, a user can confirm the information of the optional setup added to the equipment on the display section, and can install the software program of the equipment with exterior intended by the user easily.

In the above embodiment, a user can confirm the information of the exterior of the equipment on the display section, and can install the software program of the equipment with the exterior intended by the user.

What is claimed is:

1. A software installing method for installing software to a computer comprising the steps of:
reading a software program to the computer, the software program corresponding to an equipment connected to the computer;
acquiring equipment information of the equipment from the equipment connected to the computer, the equipment information including an optional setup of the equipment;
displaying an exterior image of the equipment on a display section prior to installing the software program, the exterior image of the equipment representing a combination of parts of the equipment composed based on image data of an exterior of the equipment and image data of the optional setup corresponding to the acquired equipment information; and
installing the software program to the computer.

2. The software installing method of claim 1,
wherein the equipment information acquired from the equipment includes software program information corresponding to the equipment, and
the software program information is also displayed on the display section prior to installing the software program.

3. The software installing method of claim 1,
wherein the equipment information is web page data, and
the equipment information is displayed on the display section based on the acquired web page data prior to the installing step.

4. The software installing method of claim 1,
wherein the equipment connected to the computer comprises an image forming section, and
the software program to be installed in the computer is a driver program of the equipment comprising the image forming section.

5. The software installing method of claim 1,
wherein the equipment information is acquired by using a Management Information Base in a Simple Network Management Protocol.

6. The software installing method of claim 1,
wherein the equipment information comprises information relating to the exterior of the equipment.

7. A non-transitory computer readable storage medium storing a program, wherein the program, when executed by a computer, performs the steps of:
reading a software program to the computer, the software program corresponding to an equipment connected to the computer;
acquiring equipment information of the equipment from the equipment connected to the computer, the equipment information including an optional setup of the equipment; and
displaying an exterior image of the equipment on a display section prior to installing the software program, the exterior image of the equipment representing a combination of parts of the equipment composed based on image data of an exterior of the equipment and image data of the optional setup corresponding to the acquired equipment information; and
installing the software program to the computer.

8. The computer readable storage medium of claim 7,
wherein the equipment information acquired from the equipment includes software program information corresponding to the equipment, and
the software program information is also displayed on the display section prior to installing the software program.

9. The computer readable storage medium of claim 7,
wherein the equipment information is web page data, and
the equipment information is displayed on the display section based on the acquired web page data prior to the installing step.

10. The computer readable storage medium of claim 7,
wherein the equipment connected to the computer comprises an image forming section, and
the software program to be installed in the computer is a driver program of the equipment comprising the image forming section.

11. The computer readable storage medium of claim 7,
wherein the equipment information is acquired by using a Management Information Base in a Simple Network Management Protocol.

12. The computer readable storage medium of claim 7,
wherein the equipment information comprises information relating to the exterior of the equipment.

* * * * *